Nov. 21, 1933.   C. S. McCHESNEY ET AL   1,935,780
BIAS CUTTING MACHINE
Filed Feb. 14, 1931   6 Sheets-Sheet 1

INVENTORS
CUYLER S. McCHESNEY.
FREDERICK GORDON REID.
NOYCE LAWSON CORNELL.
BY
Usina & Rauber   ATTORNEYS

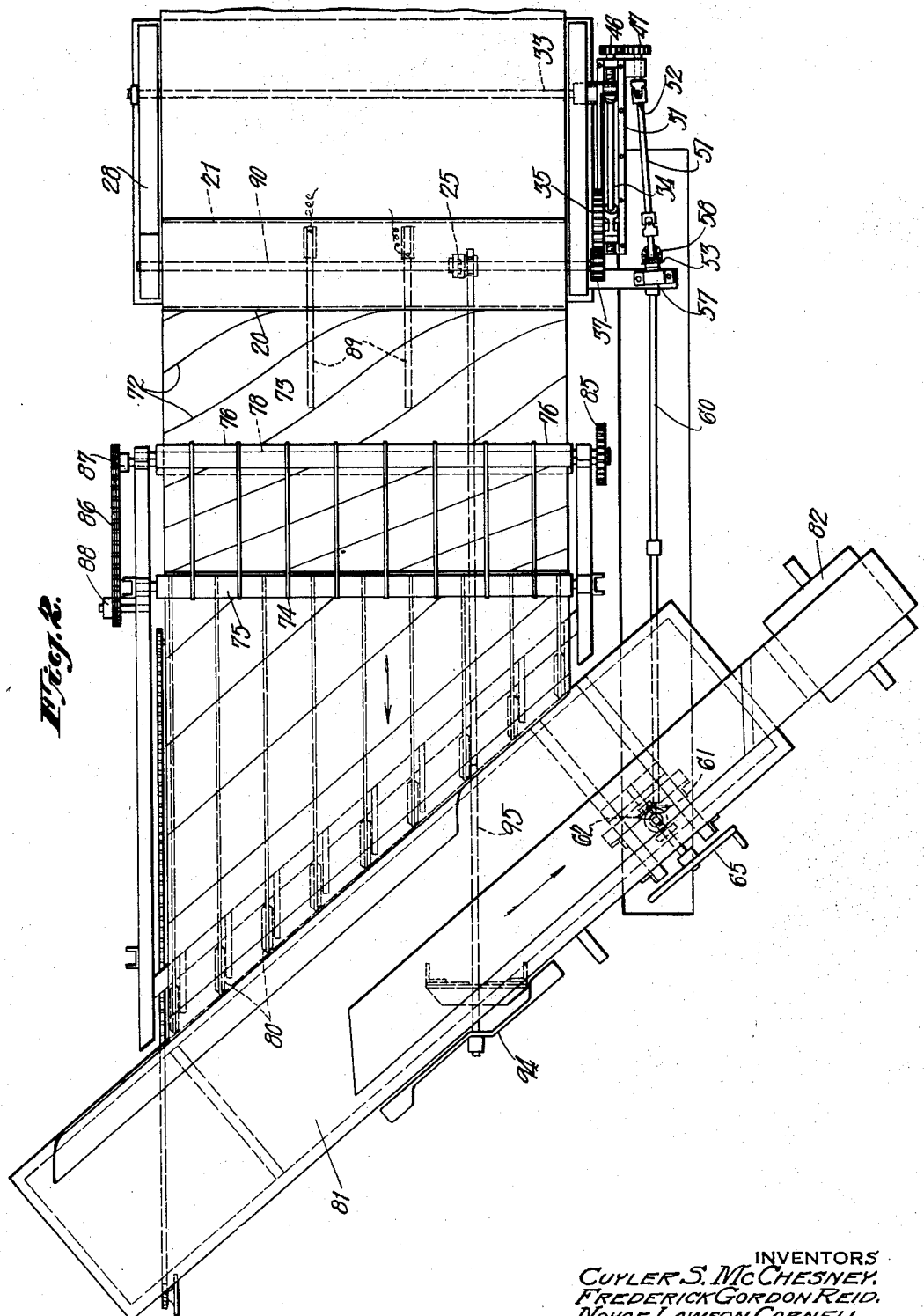

Nov. 21, 1933. C. S. McCHESNEY ET AL 1,935,780
BIAS CUTTING MACHINE
Filed Feb. 14, 1931 6 Sheets-Sheet 3
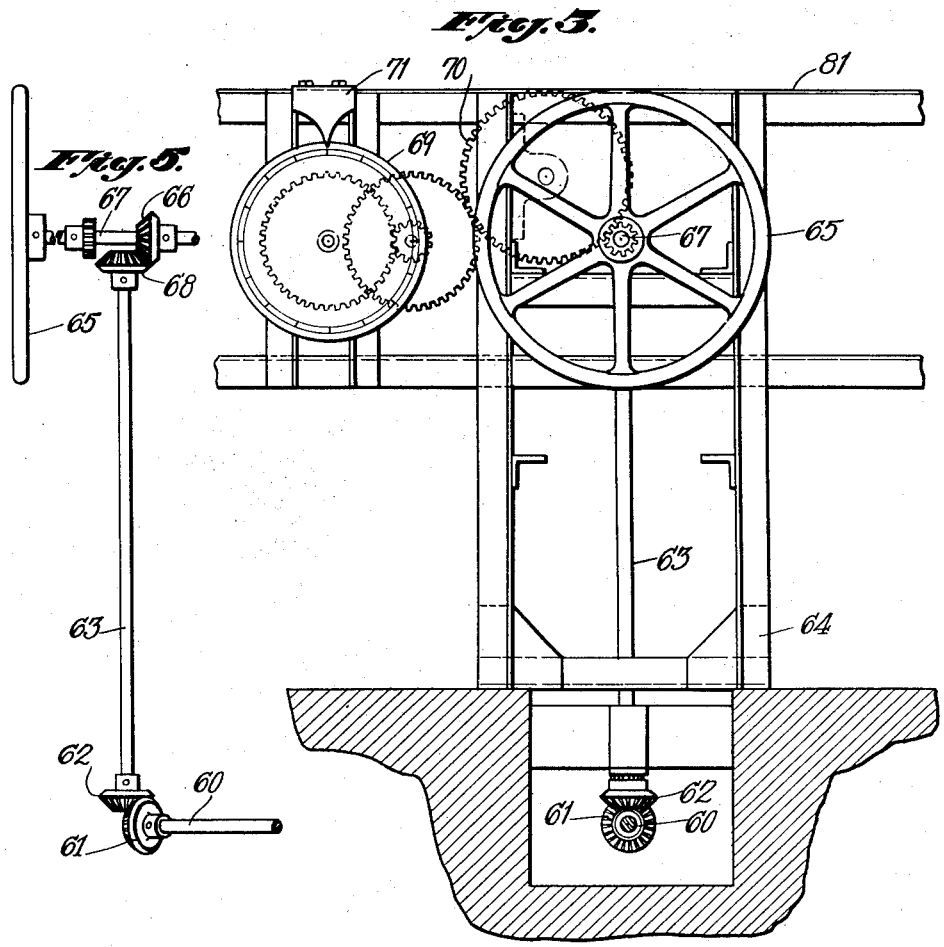
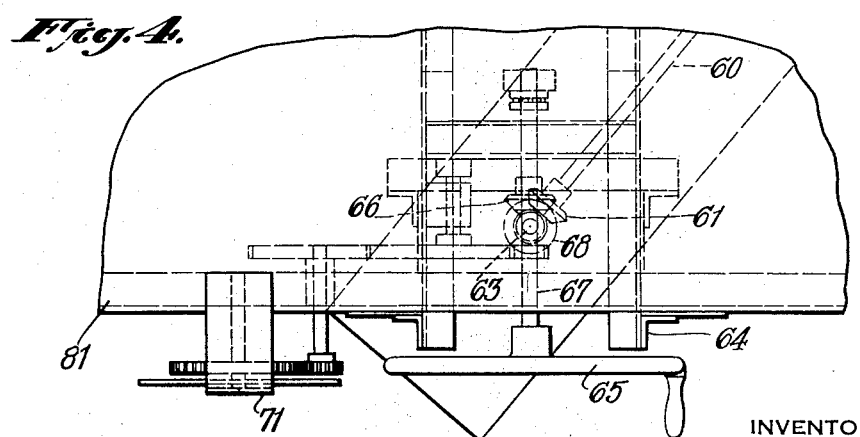
INVENTORS
CUYLER S. McCHESNEY,
FREDERICK GORDON REID,
NOYCE LAWSON CORNELL.
BY
ATTORNEYS Nov. 21, 1933.  C. S. McCHESNEY ET AL  1,935,780
BIAS CUTTING MACHINE
Filed Feb. 14, 1931  6 Sheets-Sheet 4
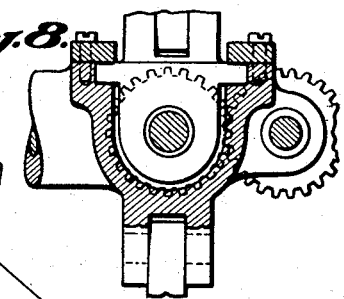
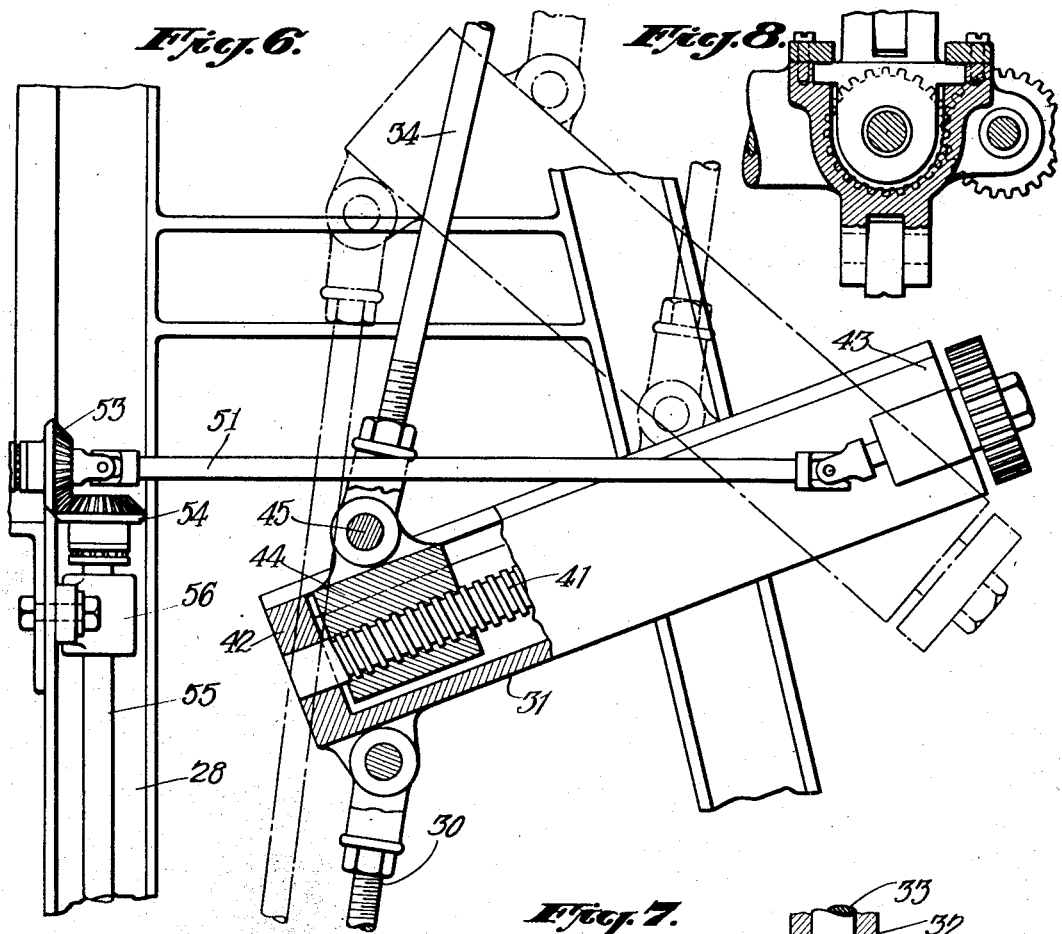
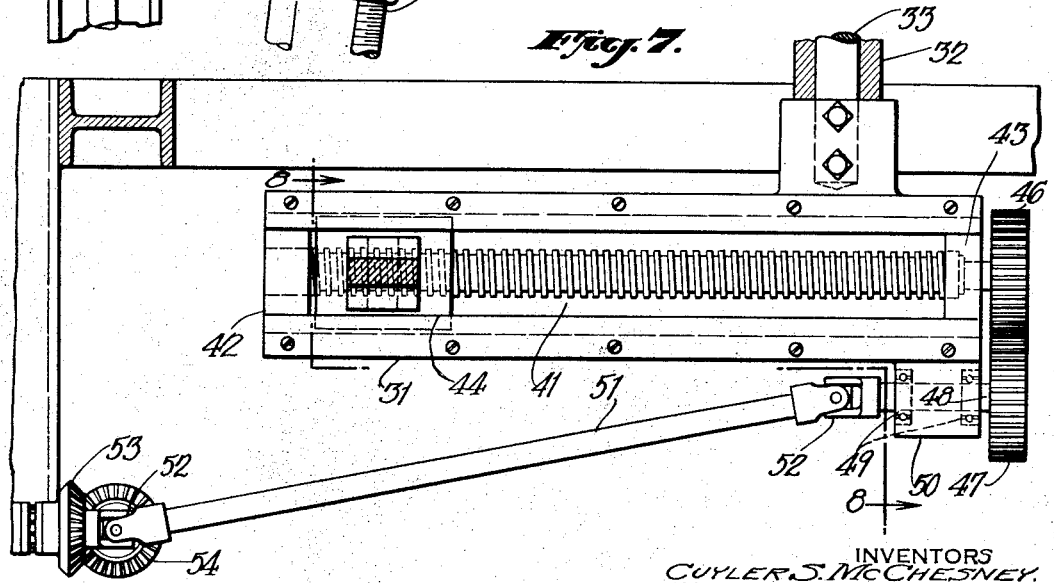
INVENTORS
CUYLER S. McCHESNEY.
FREDERICK GORDON REID.
NOYCE LAWSON CORNELL.
BY Usina & Rauber ATTORNEYS Nov. 21, 1933.　　C. S. McCHESNEY ET AL　　1,935,780
BIAS CUTTING MACHINE
Filed Feb. 14, 1931　　6 Sheets-Sheet 5
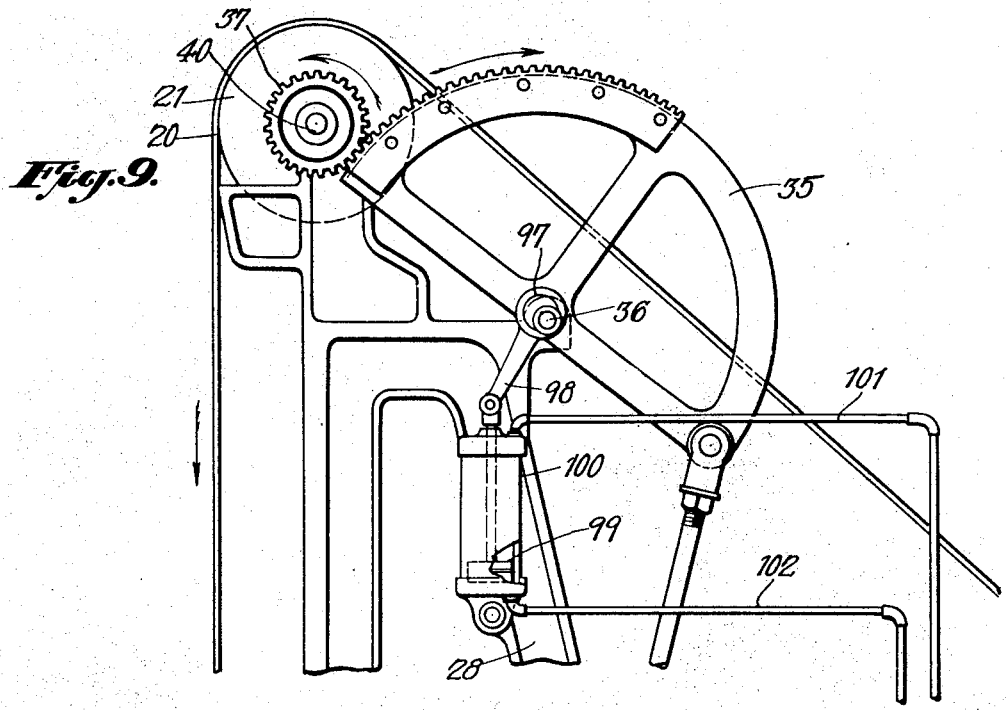
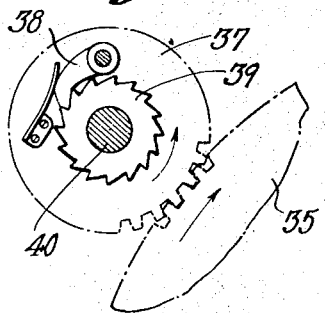
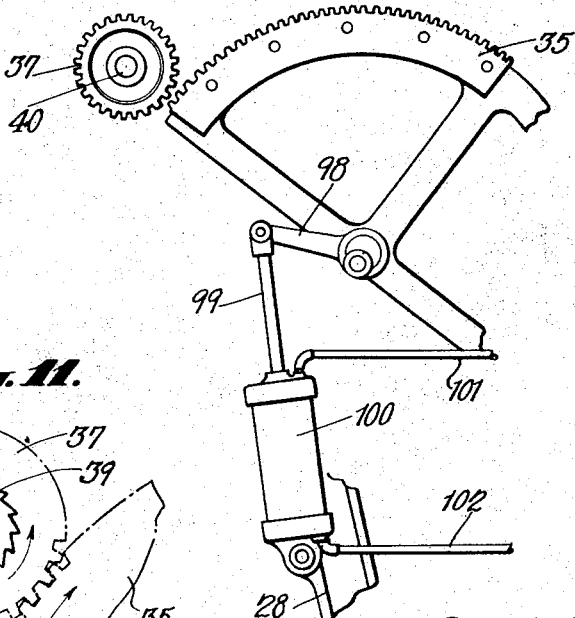
INVENTORS
CUYLER S. McCHESNEY.
FREDERICK GORDON REID.
NOYCE LAWSON CORNELL.
BY
ATTORNEYS INVENTORS
CUYLER S. McCHESNEY.
FREDERICK GORDON REID.
NOYCE LAWSON CORNELL.
BY Usina & Rauber ATTORNEYS Patented Nov. 21, 1933

1,935,780

UNITED STATES PATENT OFFICE 1,935,780

BIAS CUTTING MACHINE

Cuyler S. McChesney, Kenmore, and Frederick Gordon Reid and Noyce Lawson Cornell, Buffalo, N. Y., assignors to Dunlop Tire and Rubber Corporation, Buffalo, N. Y., a corporation of New York Application February 14, 1931. Serial No. 515,670

9 Claims. (Cl. 271—2.4)

Our invention relates to an apparatus for cutting fabrics into strips on a bias for use in the rubber industry and for other uses, and more particularly to a mechanism for varying the width of fabric between successive bias cuts. The invention also relates to an apparatus for handling the fabric which has been cut on a bias.

In apparatus for cutting fabrics on a bias the fabric is advanced between each cutting by a drum or equivalent feeding means which is rotated or advanced, by a crank arm or other suitable means, through a ratchet and transmission mechanism. To vary the width of the fabric advanced between successive cuts in machines heretofore used, it has been necessary to stop the machine and adjust the length of the actuating crank arm by moving its point of connection with the transmission mechanism to a greater or less distance from the axis of rotation. This has involved a considerable loss of time in the use of these machines, particularly as the crank on which this adjustment was made was usually somewhat remote from the take-off side of the machine at which the fabric was removed and thus somewhat distant from the position occupied by the operator.

An object of our invention is to provide an apparatus for the bias cutting of fabrics in which the changes of width between successive cuttings may be easily and quickly made without stopping the machine.

Further objects of the invention are to provide an apparatus of the above type in which the adjustment of the machine for different widths between cuttings may be made at a remote point from the cutting mechanism; to provide a mechanism in which the cut fabric is brought to a convenient position for the separation and removal of the bias cut strips; to provide an apparatus in which the mechanism for taking off the bias cut strips is driven independently of the cutting mechanism and is synchronized with the speed of the cutting mechanism and further to provide a control mechanism for synchronizing the take-off and cutting apparatus that is sensitive to the speed of the take-off mechanism relative to the cutting mechanism, that is readily operable and controlled by a light touch of the fold of the fabric between the cutting and take-off mechanism.

These and other advantages of the invention will appear more in detail from the following specification.

Various features of the invention are illustrated in the accompanying drawings in which:—

Fig. 2 is a plan view of the mechanism shown in Fig. 1;

Figs. 3, 4 and 5 are front elevation, plan and side elevation views of a portion of the mechanism for controlling the width changing apparatus;

Figs. 6, 7 and 8 are, respectively, side, plan and cross-sectional views of another part of the width changing mechanism;

Figs. 9, 10 and 11 are are detailed side elevation views of the mechanism for moving the fabric between successive bias cuttings;

In the embodiment of the invention shown in the accompanying drawings, the fabric to be cut on a bias is advanced longitudinally at intervals between each cutting operation by means of a drum which is rotated a peripheral distance equal to the width of fabric to be severed. The drum is rotated by means of a continuously rotating crank arm from which a reciprocating motion is obtained, by suitable linkages, and is transmitted to the drum through a quadrant and ratchet. The angular distance through which the drum is rotated through each reciprocation by the quadrant is controlled by the angle of oscillation of the latter, which is, in turn, controlled by the effective length of the crank arm.

In the embodiment of the invention this effective length is controlled by means of a rocker arm or lever connected in fixed relation to the actuating crank by a link and connected to the quadrant by a link whose distance from the axis of the rocker arm or lever is controlled by a screw and nut carried on the lever and geared to a control mechanism so that it may be rotated to adjust the point of connection of the link at any time without stopping the rocking of the rocker arm. For this purpose the gearing of the screw and nut device on the rocker arm is connected to the actuating mechanism through a universal joint aligned with the axis of the rocker arm.

The adjustments of widths are made between successive cuts in order that the cutting line shall not be disturbed or subject to deviations. In the event that the variation is too wide to be made between a pair of successive cuttings, the quadrant may be unmeshed from the ratchet thereby temporarily stopping the movement of the drum.

The fabric is not completely severed into bias strips by the cutting operation but is so cut as to leave sufficient continuous fabric to permit handling until brought to a convenient point for complete severing. The cut fabric is, therefore, permitted to pass from the cutting mechanism through a downwardly falling fold to the take-off mechanism which is driven separately and independently of the cutting mechanism and carries the cloth over a drop arranged in a bias position so that the cuts are horizontal and the bias cut strips may be separated and handled.

The speed of the take-off machine is so controlled that it synchronizes with the cutting mechanism, being speeded up by the drop of the fold and retarded by the taking up of the fold between the two machines.

Figure 1:
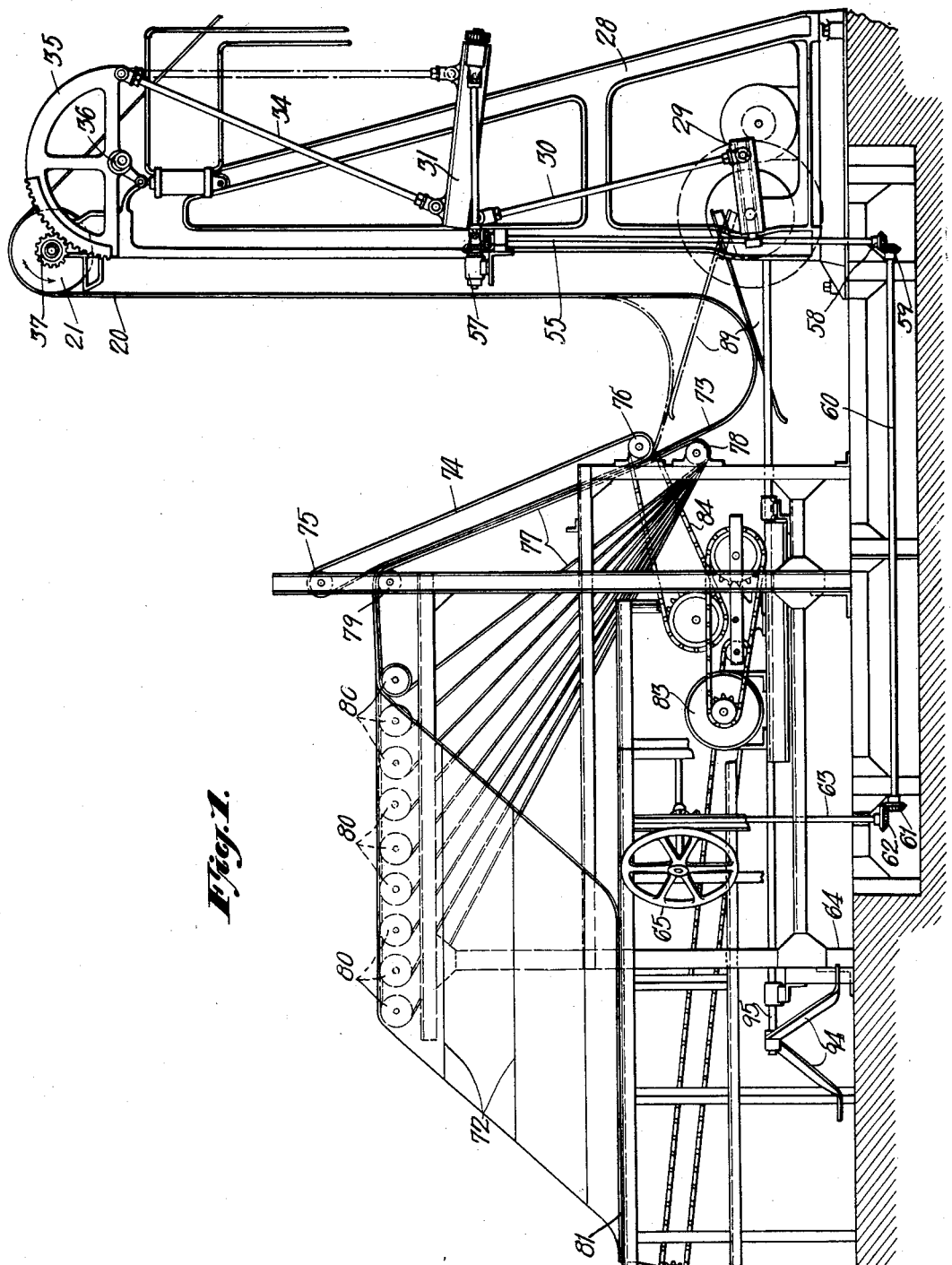
Fig. 1 is a side elevation of a bias cutting fabric take-off mechanism embodying a preferred form of the invention.
Figure 13:
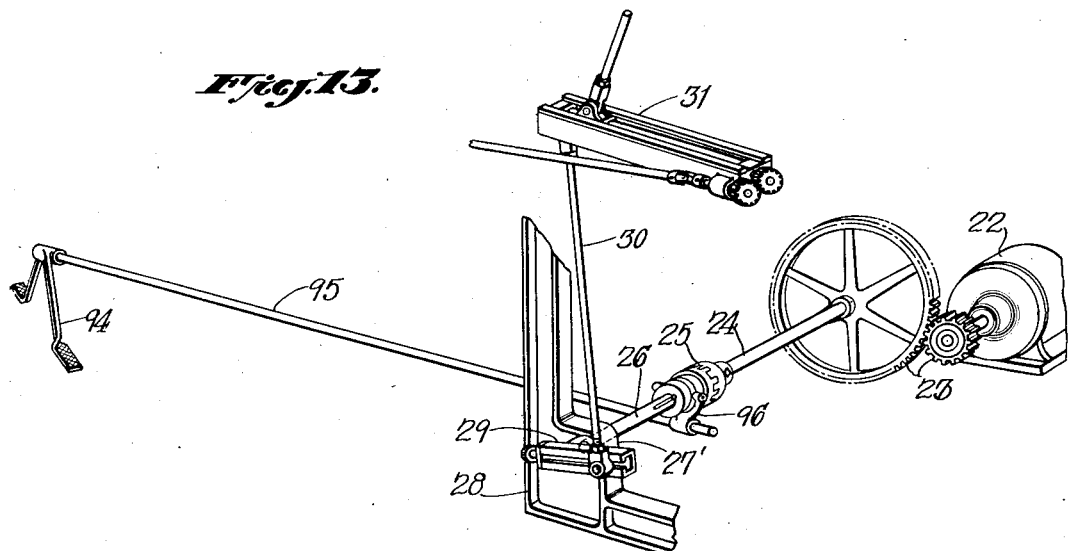
Fig. 13 is a perspective view of a part of the drive mechanism for advancing the fabric.

Referring more particularly to the accompanying drawings, the length of fabric 20 is drawn over a drum 21, which is intermittently rotated in the direction of the arrow, Fig. 1, and is severed on a bias between the movements of the drum 21 by means of a cutting mechanism not forming a part of the present invention and not shown in the accompanying drawings. Power for driving the drum 21 is supplied from an electric motor 22, Fig. 13, or other suitable source of power, through gears 23 to a shaft 24 and thence through a clutch 25 to a driving shaft 26 mounted in bearing 27 in the frame 28 of the machine. A crank arm 29 is secured on the projecting end of the shaft 26 (Figs. 1, 2 and 13) and is thus rotated continuously. The rotational movement of the crank arm 29 is transformed into a reciprocating movement and transmitted, through a link 30, to a rocker arm 31 which is pivoted in a bearing 32 in the frame of the machine by means of a side-wise projecting shaft 33 (Figs. 6 and 8). The reciprocating movement of the rocker arm 31 is transmitted through a link 34 to one end of a quadrant 35 which is mounted on a rock shaft 36. The rocking or oscillating movement thus imparted to the quadrant 35 is transmitted to a pinion 37 which meshes with the teeth of the quadrant 35, and from the pinion 37 a forward movement is transmitted through a pawl 38 on the pinion 37, Fig. 11, to a ratchet wheel 39 and to a shaft 40 on which the ratchet wheel 39 and the drum 21 are mounted.

Thus the rocking movement of the quadrant 35 is transformed into a source of intermittent forward movements of the drum 21 and the extent of each movement is proportional to the swing or angle of movement of the quadrant 35. The angle of oscillation of the quadrant 35 is varied by adjusting the distance, from the axis of the shaft 33, of the connection of the link 34 to the rocker arm 31. For this purpose the arm 31 is made in a channel form or U-shaped in cross section, as shown in Figs. 6, 7 and 8, and is provided with a longitudinally extending screw 41 which is journaled in opposite ends 42 and 43 of the arm 31. On the screw 41 is mounted a nut 44 which is longitudinally slidable and guided in the channel of the arm 31 and is pivotally connected by a pin 45 to the lower end of the link 34.

It will be evident that, as the screw 41 is rotated in one direction or the other, the nut 44 will travel to or from the axis of the shaft 33 and will thus vary the extent of throw of the link 34 and the angle of oscillation of the quadrant 35 to thus vary the distance of rotation of the drum 21 for each intermittent movement.

The screw 41 is rotated through a gear 46 mounted on the projecting end of the screw 41 and meshes with a driving gear 47 which is mounted on a shaft 48 journaled in bearings 49 supported on a bracket 50 at the side of the arm 31. The projecting end of the shaft 48 is connected to a control shaft 51 by means of a universal joint 52, the axis of the joint being in line with the axis of the rock shaft 33 so that the arm 31 and, with it, the shaft 48 rock about the axis of the universal joint 52 and the latter remains in fixed position during the rocking of the arm 31.

The shaft 48 may thus be rotated by the shaft 51 while the shaft 48 and the rocker arm 31 rock about the axis of the shaft 33. The shaft 51 may be rotated, to rotate the shaft 48 and screw 41 and thus adjust the position of the nut 44 and the movement of the drum 21 directly by a crank or wheel or from a distance by any suitable gearing.

In the embodiment shown in the accompanying drawings, the shaft 51 is connected through a universal joint 52 and bevel gears 53 and 54 to a vertical shaft 55 journaled in a suitable bracket 56 on the frame 28 of the cutting mechanism, the beveled gear 53 journaled on the bracket 57 of the frame 28. The shaft 55 is geared, through a bevel gear 58 at its lower end to a bevel gear 59 and thence through a shaft 60 and gears 61 and 62 to a vertical shaft 63 journaled in suitable bearings in the frame 64 of the take-off machine at one side of the bias cutting apparatus. The shaft 63 is rotated in one direction or the other by means of a hand wheel 65, journaled in the frame 64, through bevel gear 66 mounted on the shaft 67 of the hand wheel 65 and a bevel gear 68 mounted on the upper end of the shaft 63. Thus the rotation of the hand wheel 65 in one direction or another is transmitted through shafts 67, 63, 60, 55, 51 and 48 and through the gears 47 and 46 to the screw 41 and rotates the screw 41 in proportion to the rotation of the hand wheel 65. The position of the nut 44 and its distance from the axis of the rock shaft is thus controlled by the position of the hand wheel 65 for all positions of the rocker arm 31 and during the rocking of the latter.

The extent of rotation of the hand wheel 65 in one direction or another is indicated by means of a dial 69 which is geared through a gear train 70 to a shaft 67 and which is provided with a series of marks positioned to be brought adjacent the pointer 71 as the dial is moved. The gear train 70 is so designed that the marks on the dial 69 will indicate the distance of the nut 44 on the axis of the arm 41 or will indicate the proportionate movement of the periphery of the drum 21 and thus the width of the strip between the successive movements.

Figure 12:
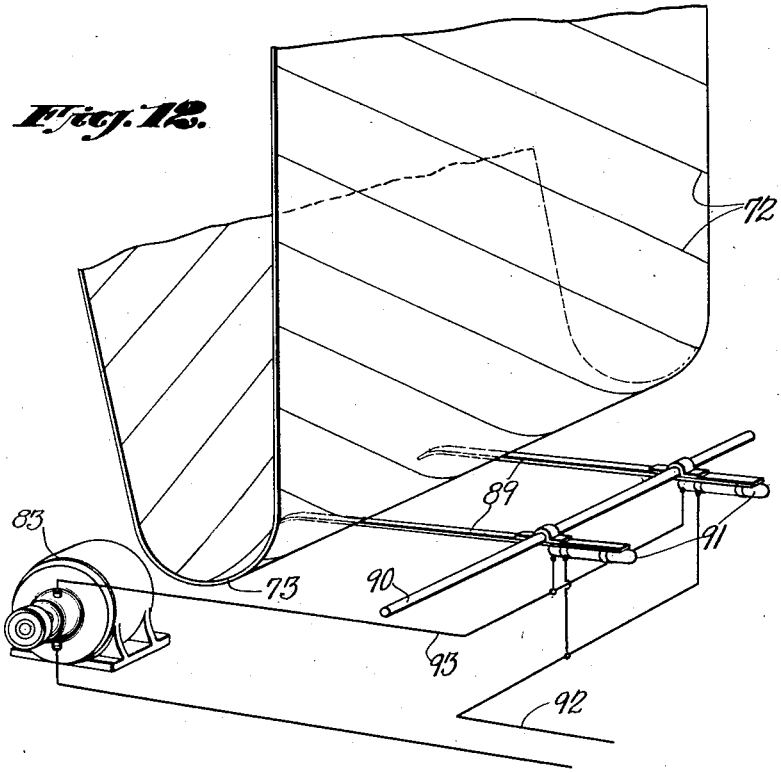
Fig. 12 is a perspective view of a part of the take-off mechanism.

The action of the cutting mechanism is such as to cut the fabric in a bias direction without completely severing the cut strips and so that the latter will hang together in a continuous fabric while subjected to the necessary handling but which can be readily pulled apart by the operator when they are brought to a position to be spliced together end to end. As the fabric is delivered over the delivery edge of the drum 21, the cuts travel diagonally downwardly as indicated at 72, Figs. 12, 1 and 2, and are not in a convenient position for intermittently successively detaching the bias cut strips. The fabric is, therefore, permitted to drop downwardly in a fold 73 and is then passed between an upper endless band or series of bands or ribbons 74 trained by the upper pulley 75 and the lower pulley 76, and a series of lower parallel bands or strips 77 trained about a lower drum or roller 78 and passing over an upper drum 79 and then over individual pulleys 80 in the same plane as the upper drum 79 but at successively increasing distances so that the line of their axes is parallel to the bias cuttings 72.

The fabric 20 is carried upwardly between the adjacent lengths of the endless bands or strips 74 and 77 and then delivered in a horizontal direction over the pulley 79 to the spaced pulleys 80. It then drops downwardly over the pulleys 80. As the pulleys 80 are parallel to the cuts 72, the strips between the latter hang in a parallel direction so that they may be separated and individually detached by a sharp downward pull and thus brought onto the table 81 in a convenient position for splicing them at their ends in a continuous bias strip, whereupon they may be rolled on a roller 82. The drums or rollers 76 are driven from a motor 83 mounted on a frame 64 through a suitable belt indicated at 84 and trained over the pulley 85, keyed on a projecting end of the shaft 76. The drum 78 is driven at an equal speed to the drum 76 by means of a belt 86 trained over a pulley 87 keyed to the shaft of the drum 76 and over a pulley 88 keyed on the shaft of the drum 78. The belts 74 and 77 are, therefore, driven independently of, and without abstraction of power from, the cutting mechanism. These speeds of the belts 74 and 77 and of the take-off mechanism may, therefore, be varied independently of the bias cutting mechanism but are synchronized with the latter through a suitable control mechanism. This control mechanism comprises a pair of levers 89 mounted on a rock shaft 90 and projecting into a position to meet the fold 73. The levers 89 are so balanced as to swing into the position shown in dotted lines in Fig. 1 but can be changed into the position shown in full lines therein by a light contact with the fold 73 when the latter increases in length.

Mounted on the levers 89 are electric switches 91 that are connected to the control of the driving motor 83 of the take-off mechanism in such a manner that when the levers 89 are depressed to their lowermost position, contact is made between the leads 92 and 93 for controlling current to the motor 83 and when the fold 73 is taken up and the levers 89 swing to their uppermost position, the circuit is broken and the motor 83 stopped or retarded until a length of fold again accumulates between the cutting and take-off machine.

When a small change is to be made in the width of the bias strips, it may be made by rotating the wheel 65 during the return movement of the quadrant 35. However, if the change in width is too great to permit a sufficient rotation of the wheel 65 during this short period of return movement, the machine may be stopped temporarily either by disengaging the clutch 25 or by moving the quadrant 35 out of mesh with the pinion 37.

To operate the clutch from a position convenient to the table 81, a foot lever or pair of foot levers 94 are mounted on a rock shaft 95 that extends from the front part of the take-off machine to proximity to the shaft 24 and is provided with suitable yokes 96 to engage the clutch. To move the quadrant 35 out of engagement with the pinion 37, the quadrant 35 is pivoted on an eccentric 97, the position of which is controlled by an arm 98 which, when in a downwardly pointed position, as shown in Fig. 9, projects the quadrant 35 into mesh with the pinion 37, but when tilted upwardly to the position shown in Fig. 10, swings the quadrant out of mesh.

The tilting of the arm 98 is accomplished by means of a piston 99 in a cylinder 100 having pipes 101 and 102 to admit air or other fluid to one end or the other of the cylinder 100 and thus move the piston 99 and swing the arm 98.

In résumé, the operation of the apparatus is briefly as follows:—

A continuous rotary motion is imparted to the crank arm 29 from a driving motor 22 through the gears 23 and the clutch 25 and from the rotating arm 29 a rocking movement is imparted to the pivoted rock arm 31 by means of a connecting rod 30. A swing of fixed amplitude is thus imparted to the rocking lever 31. This rocking movement of the lever 31 is transmitted to the quadrant 35 and transformed into an oscillating movement by means of the connecting rod 34, the point of attachment of which is adjustable lengthwise of the lever 35. The oscillation movement of the quadrant 35 is transmitted to the pinion 37 and from the latter is transformed into an intermittent forward movement by means of the pawl and ratchet 38—39, Fig. 11, and transmitted to the shaft 40 and drum 21 by which the fabric is advanced at intervals. The cloth is cut between intervals of movement by means of a standard cutting apparatus not shown.

The point of attachment of the connecting rod 34 to the lever 31 is adjusted by means of a screw 41 rotatably mounted in the arm 31 and threaded through a nut 44, to which the lower end of the connecting rod 34 is attached, so that as the screw is rotated in one direction it moves the nut 34 towards the pivot of the lever 31 and, as it is rotated in the opposite direction, moves the nut 34 away from the pivotal axis of the lever.

The rotation of the screw 41 is actuated from a hand wheel 65 through the gears and shaft 67, 66, 68, 63, 62 and 61, Fig. 5, 60, 59, 58 and 55, Fig. 1, and 54 and 53 to the shaft 52, one end of which is secured into a universal joint 52 in alignment with the axis of swing of the lever 31. Through the universal joint 52, the rotation of the shaft 51 is transmitted to a shaft 48 which is mounted on the rocks with the lever 31 and thence through the gears 47 and 46 to the screw 41.

The fabric 20 is severed diagonally or on a bias by the cutting apparatus, leaving just sufficient material to form a continuous strip but sufficiently cut that the strips between cuts can be readily separated. The fabric falls in a fold as shown in Fig. 1 and is then conveyed by means of the endless belts 74 and 77 to a horizontal plane and then falls downwardly over the biased or diagonally spaced pulleys 80 thus bringing the bias cuts 72 in a horizontal position. The endless belts 74 and 77 are driven from a motor 83 which is controlled by means of mercury switches 91. The switches 91 are mounted on lever arms 89 positioned in the fall of a fold 73 and acting when depressed to start the motor 83 and when raised to stop or retard the motor and thus synchronize the receiving belt 74 and 77 with the cutting mechanism.

Various modifications may be made by those skilled in the art without departing from the invention as defined in the following claims:

What we claim is:

1. An apparatus for advancing the fabric for bias cutting which comprises a drum, a reciprocating member, a rocker arm rocked by said reciprocating member, a ratchet transmission between said rocker arm and said drum, a connecting rod from said transmission means to said rocker arm, and means for adjusting the point of attachment of said transmission means to said rocker arm at a desired distance from the axis of oscillation of said arm, said adjusting means having a terminal at the axis of oscillation of said arm and a fixed actuating member connected thereto at said axis by a universal connection.

2. An apparatus for advancing the fabric for bias cutting which comprises a drum, a pivoted arm, a ratchet transmission member between said arm and said drum and a screw and nut connection on said arm for securing said transmission member thereto to adjust its distance from the pivotal axis of said arm, said screw having a driving means terminating at the pivotal axis of said arm and a driving member connected thereto at said axis by a universal connection.

3. An apparatus for intermittently advancing the fabric for bias cutting which comprises a drum, a pivoted rocker arm, a ratchet transmission mechanism between said rocker arm and said drum, a screw mounted longitudinally on said rocker arm, a nut on said screw, means for connecting said transmission mechanism to said nut, means terminating at the axis of said rocker arm to rotate said screw and an actuating mechanism connected to said means at said axis.

4. An apparatus for intermittently advancing the fabric for bias cutting which comprises a rotatable drum, a rotating arm, a rocker arm, means for connecting said rotating arm to said rocker arm, a ratchet transmission mechanism between said drum and said rocker arm, means for securing said transmission mechanism to said rocker arm, and means to vary the relative distance of the attachment of said transmission mechanism thereto from the axis of said rocker arm, said means terminating at the axis on said rocker arm and having a universal connection at said axis.

5. An apparatus for intermittently advancing fabric for bias cutting which comprises a rotatable drum, a rotating arm, a rocker arm, means for attaching said rotating arm to said rocker arm at definite distances from their axes, a transmission mechanism, means for securing said transmission mechanism to said rocker arm, means for adjusting the connection of said transmission mechanism longitudinally of said rocker arm, and means in said transmission mechanism for transforming the reciprocating motion of said rocker arm into an intermittent rotational movement of said drum, said adjusting means having a terminal at the axis of oscillation of said arm and a fixed actuating member connected thereto at said axis by a universal connection.

6. A fabric advancing means for bias cutting which comprises a drum, a rocker arm, means for rocking said arm through a definite angle amplitude, a gear segment, a connecting rod from said gear segment to said rocker arm, means terminating at the axis of said rocker arm for moving the point of connection of the connecting rod to said arm lengthwise of said arm, a universal connection for said means at the axis of said rocker arm and means for transforming the reciprocating motion of said segment into an intermittent rotational movement and transmitting said movement to said drum.

7. An apparatus for intermittently advancing the fabric for bias cutting which comprises a rotatable drum, a rocker arm, means for rocking said rocker arm through a definite amplitude, a screw on said rocker arm, a nut on said screw, a gear segment, a connecting rod between said gear segment and said nut, a ratchet transmission mechanism between said gear segment and said drum, gearing on said rocker arm for rotating said screw, a stationary transmission and a universal joint between said stationary mechanism and said mechanism on said rocker arm, said universal joint being in the axis of oscillation of said arm.

8. Apparatus for advancing fabric for bias cutting which comprises a drum, a rocker arm, means for rocking said rocker arm through a definite amplitude, a connecting rod between said rocker arm and said drum, and adjustably attached to said rocker arm, means for transforming reciprocating movement of said connecting rod to unidirectional movement to said drum and means terminating at the axis of said rocker arm for adjusting the distance of the point of attachment of said connecting rod to said rocker arm from the axis of said arm and means for driving said adjusting means through said end terminating at said axis.

9. Apparatus for advancing fabric for bias cutting which comprises a drum, a rocker arm, means for rocking said rocker arm through a definite amplitude, means adjustably attached to said rocker arm for transmitting the reciprocating motion of said rocker arm to said drum in a unidirectional motion, and means terminating at the axis of said rocker arm for adjusting the point of attachment of said means to said rocker arm and means connecting said adjusting means at the axis of said rocker arm for transmitting motion to said adjusting means.

CUYLER S. McCHESNEY.
FREDERICK GORDON REID.
NOYCE LAWSON CORNELL.